(12) United States Patent
Franz et al.

(10) Patent No.: US 6,907,427 B2
(45) Date of Patent: Jun. 14, 2005

(54) INFORMATION RETRIEVAL WITH NON-NEGATIVE MATRIX FACTORIZATION

(75) Inventors: Martin Franz, Yorktown Heights, NY (US); Jeffrey S. McCarley, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/862,524

(22) Filed: May 22, 2001

(65) Prior Publication Data

US 2003/0018604 A1 Jan. 23, 2003

(51) Int. Cl.[7] .............................................. G06F 17/30
(52) U.S. Cl. .............................. 707/7; 707/101; 704/7
(58) Field of Search .................... 707/1–10, 100–104.1, 707/200–205; 704/7, 10.9

(56) References Cited

U.S. PATENT DOCUMENTS

| 4,384,329 A | * | 5/1983 | Rosenbaum et al. ........... 704/10 |
| 4,823,306 A | * | 4/1989 | Barbic et al. ................... 707/5 |
| 5,873,056 A | * | 2/1999 | Liddy et al. .................... 704/9 |

* cited by examiner

Primary Examiner—Mohammad Ali
(74) Attorney, Agent, or Firm—F. Chau & Associates, LLC

(57) ABSTRACT

A method of indexing a database of documents, by providing a vocabulary of n terms, indexing the database in the form of a non-negative n×m index matrix V, wherein each of its m columns represents an $j^{th}$ document having n entries containing a function of the number of occurrences of a $i^{th}$ term of said vocabulary appearing in said $j^{th}$ document, factoring out non-negative matrix factors T and D such that V≈TD, and wherein T is an n×r term matrix, D is an r×m document matrix, and r<nm/(n+m). The index so generated is useful in two-pass information retrieval systems.

21 Claims, 2 Drawing Sheets

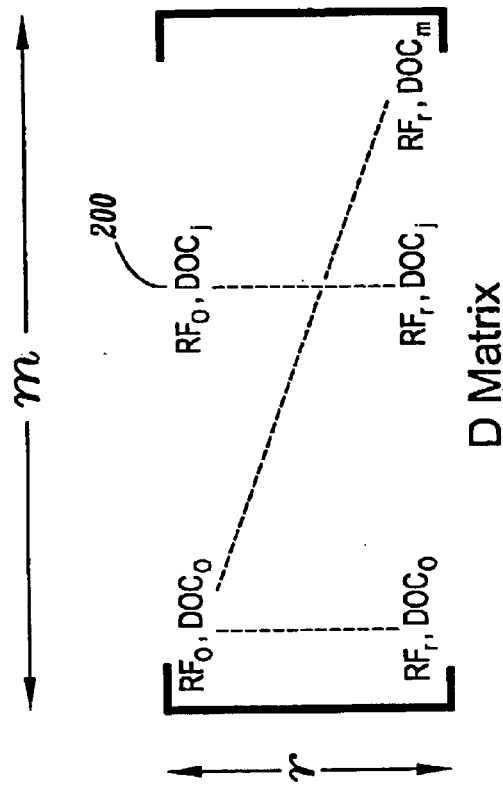
FIG. 2b D Matrix
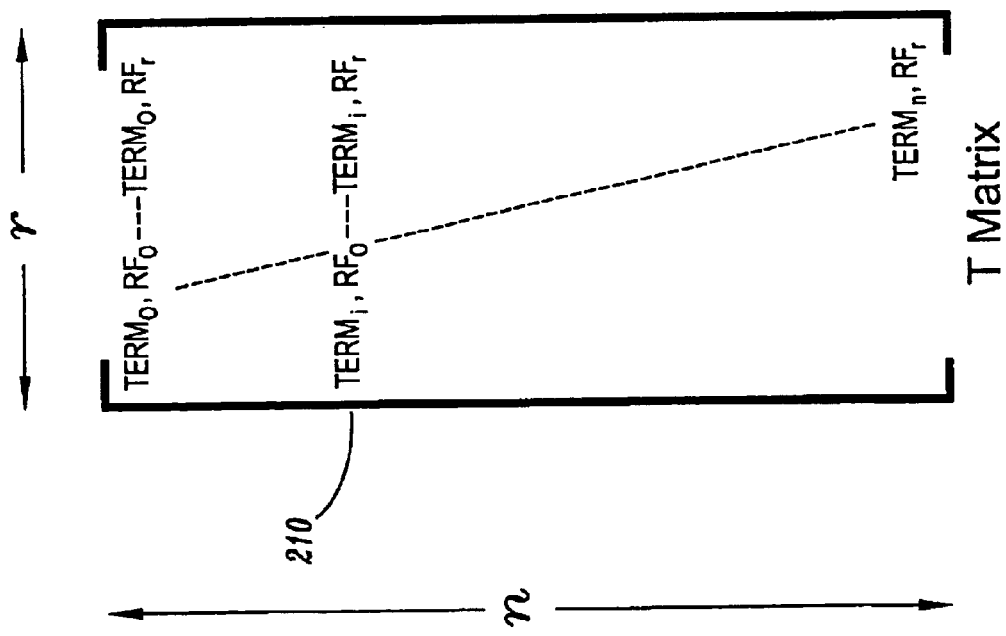
FIG. 2a T Matrix

INFORMATION RETRIEVAL WITH NON-NEGATIVE MATRIX FACTORIZATION

This work was supported under a DARPA government contract, SPAWAR contract No. N66001-99-2-8916.

BACKGROUND OF THE INVENTION

1. Field of the Invention

This invention relates to the retrieval of information from a database and, more particularly, to the indexing of information for retrieval from a database in a manner that compresses the index so as to consume less storage memory.

2. Discussion of the Related Art

The purpose of an information retrieval (IR) system is to search a database and return information (hereinafter, the term documents will be used to refer to returned information, though such information need not actually be documents in the word-processing sense, but rather may be any information, including web pages, numbers alphanumerics, etc., or pointers or handles or the like thereto) in response to a query.

Most high-precision IR systems in use today utilize a multi-pass strategy. Firstly, initial relevance scoring is performed using the original query, and a list of hits is returned, each with a relevance score. Secondly, a second scoring pass is made, using the information found in the high scoring documents.

Because document databases can be huge, it is desirable to represent the databases in a way that minimizes media space. Commonly, internal data in a database is represented by indexes. Note that the indexes for the two relevancy passes described above are usually different. The first relevancy pass usually uses what is known as an inverted index, meaning that a given term is associated with a list of documents containing the term. In the second index, a given document is associated with a list of terms appearing in it. The result is that a two pass system consumes roughly double the media space of a one-pass system. What is needed is a system that delivers the retrieval performance of the two-pass system without consuming as much media space.

SUMMARY OF THE INVENTION

Disclosed is a method of indexing a database of documents, comprising providing a vocabulary of n terms; indexing the database in the form of a non-negative n×m index matrix V, wherein m is equal to the number of documents in the database, n is equal to the number of terms used to represent the database, and the value of each element $v_{ij}$ of index matrix V is a function of the number of occurrences of the $i^{th}$ vocabulary term in the $j^{th}$ document; factoring out non-negative matrix factors T and D such that V≈TD; and wherein T is an n×r term matrix, D is an r×m document matrix, and r<nm/(n+m).

In another aspect of the invention, the index matrix V is deleted.

In another aspect of the invention, the term matrix T is deleted.

In another aspect of the invention, r is at least one order of magnitude smaller than n.

In another aspect of the invention, r is from two to three orders of magnitude smaller than n.

In another aspect of the invention, entries of said document matrix D falling below a predetermined threshold value t are set to zero.

In another aspect of the invention, said factoring out of non-negative matrix factors T and D further comprises selecting a cost function and associated update rules from the group:

cost function $$F = \sum_{i=1}^{n}\sum_{j=1}^{m}[V_{ij}\log(TD)_{ij} - (TD)_{ij}]$$

associated with update rules $$T_{ik} \leftarrow T_{ik}\sum_{j}\frac{V_{ij}}{(TD)_{ij}}D_{kj},\ T_{ik} \leftarrow \frac{T_{ik}}{\sum_{l}T_{lk}},\text{ and}$$

$$D_{kj} \leftarrow D_{kj}\sum_{i}T_{ij}\frac{V_{ij}}{(TD)_{ij}},$$

cost function $$F = \sum_{i=1}^{n}\sum_{j=1}^{m}\left[V_{ij}\log\frac{V_{ij}}{(TD)_{ij}} - (V_{ij}) + (TD)_{ij}\right]$$

associated with update rules $$D_{kj} \leftarrow D_{kj}\frac{\sum_{i}\frac{T_{ik}V_{ij}}{(TD)_{ij}}}{\sum_{l}T_{lk}}\text{ and }T_{ik} \leftarrow T_{ik}\frac{\sum_{j}\frac{D_{kj}V_{ij}}{(TD)_{ij}}}{\sum_{h}D_{kh}},$$

and cost function $$\|V - TD\|^2 = \sum_{i=1}^{n}\sum_{j=1}^{m}(V_{ij} - (TD)_{ij})^2$$

associated with update rules $$D_{kj} \leftarrow D_{kj}\frac{(T^TV)_{kj}}{(T^TTD)_{kj}}$$

and $$T_{ik} \leftarrow T_{ik}\frac{(VD^T)_{ik}}{(TDD^T)_{ik}};$$

and iteratively calculating said update rules so as to converge said cost function toward a limit until the distance between V and TD is reduced to or beyond a desired value.

Disclosed is a database index, comprising an r×m document matrix D, such that V≈TD wherein T is an n×r term matrix; V is a non-negative n×m index matrix, wherein each of its m columns represents an $j^{th}$ document having n entries containing the value of a function of the number of occurrences of a $i^{th}$ term appearing in said $j^{th}$ document; and wherein T and D are non-negative matrix factors of V and r<nm/(n+m); and wherein each of the m columns of said document matrix D corresponds to said $j^{th}$ document.

Disclosed is a method of information retrieval, comprising providing a query comprising a plurality of search terms; providing a vocabulary of n terms; performing a first pass retrieval through a first database representation and scoring m retrieved documents according to relevance to said query; executing a second pass retrieval through a second database representation and scoring documents retrieved from said first pass retrieval so as to generate a final relevancy score for each document; and wherein said second database representation comprises an r×m document matrix D, such that V≈TD wherein T is an n×r term matrix; V is a non-negative n×m index matrix, wherein each of its m columns represents an $j^{th}$ document having n entries containing the value of a function of the number of occurrences of a $i^{th}$ term of said vocabulary appearing in said $j^{th}$ document; and wherein T and D are non-negative matrix factors of V and r<nm/(n+m); and wherein each of the m columns of said document matrix D corresponds to said $j^{th}$ document.

In another aspect of the invention, the final relevancy score for any $j^{th}$ document is a function of said $j^{th}$ document s corresponding entry in said document matrix D and the corresponding entries in said document matrix D of the K top-scoring documents from said first pass retrieval.

In another aspect of the invention, the relevancy score function for said $j^{th}$ document is proportional to a sum of cosine distances between said $j^{th}$ document s corresponding entry in said document matrix D and each of said corresponding entries in said document matrix D of the K top-scoring documents from said first pass retrieval.

Disclosed are articles of manufacture comprising a computer-usable medium having computer-readable program means embodied in said medium for executing the methods disclosed herein.

BRIEF DESCRIPTION OF THE DRAWINGS

FIG. 2*a* is a diagram of a term matrix.

FIG. 2*b* is a diagram of a document matrix.

DETAILED DESCRIPTION OF PREFERRED EMBODIMENTS

Figure 1:
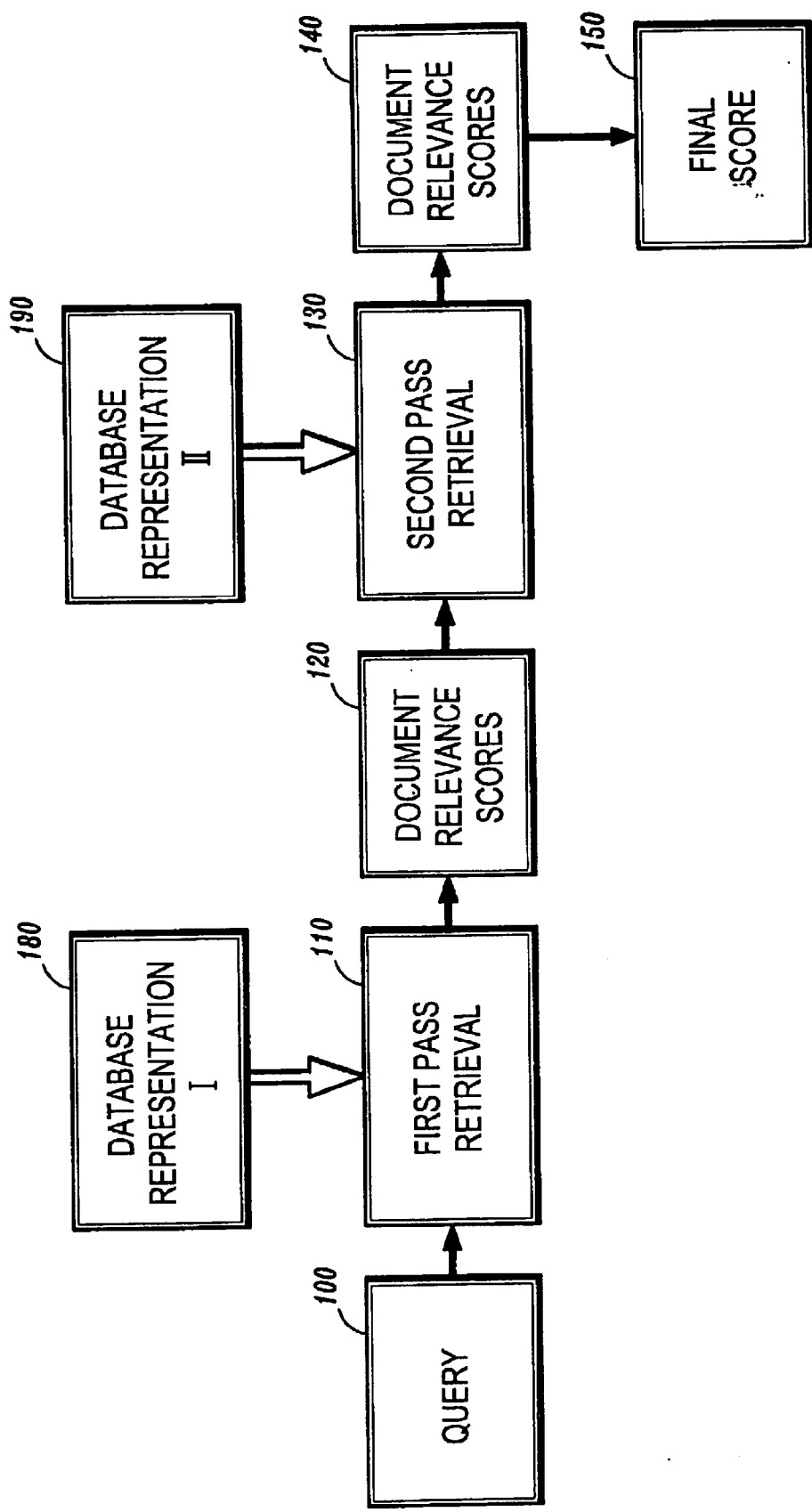
FIG. 1 is a flow diagram of the overall process of an embodiment of the invention.

Referring to FIG. 1, we see a generalized information retrieval process for retrieving documents from a database such as would be executed by computer-readable program code means embodied in a computer-usable medium, such as is well known in the art. A query 100, specifying one or more search terms is received by the system and utilized in a first pass retrieval 110 from a first database representation 180. The first database representation is usually in the form of an inverted index, meaning an index of terms wherein each term is associated with a list of every document in the database containing that term. This permits use of a relevance scoring method, such as for example, an Okapi method such as described in S. E. Robertson et al., *Okapi at TREC*-3, Proceedings of the Third Text Retrieval Conference (TREC-3), edited by D. K. Harman, NIST Special Publication 500-225 (1995), the teachings of which are incorporated by reference herein in their entirety, though the Okapi method is certainly not the exclusive means of carrying out this operation. Whatever method is used, document relevance scores are generated 120 and the system enters a second pass retrieval operation 130. The second pass retrieval 130 accesses a second database representation 190 to generate a second relevance score, which may be combined with the first generated scores to generate a final score 150. In the prior art, the second database representation will be in the form of an index of documents wherein each document is associated with a list of all terms in that document. The use of such a second index will usually double the size of the storage requirements for the indices.

As a practical matter, not all terms will generally be listed because to do so would make the index unwieldy without improving performance. Hence common terms, such as the, a, to, and the like will be excluded where we are speaking of text documents. To effect these exclusions, it is common practice to include a vocabulary of searchable terms. Only those terms listed in the vocabulary will be eligible to be listed in the indices. Referring to FIGS. 2*a* and 2*b*, the invention utilizes a procedure known as non-negative matrix factorization (sometimes positive matrix factorization) to reduce the memory requirements of the second database representation 190. To do this, an index comprising an n×m matrix V (not shown) is first created, the m columns of which each corresponds to one of m documents in the database. Each of the n rows corresponds to a term in a vocabulary (not shown) comprising n terms. Each entry $v_{ij}$ in the index matrix corresponds to the term frequency (TF) of a $i^{th}$ term in an $j^{th}$ document that is a function of the number of times the $i^{th}$ term appears in the $j^{th}$ document. In most cases, the entry will simply be equal to the number of times the term appears in the document. In one embodiment, a new matrix V will be generated whenever there is a change to the vocabulary or any document, or a document is added or deleted.

After V is created, a rank of factorization (RF) r is selected, preferably such that r<n and r<m. The RF is used to factor out the n×m V matrix into an n×r term matrix T (FIG. 2*a*) and an r×m document matrix D (FIG. 2*b*), such that:

$$V \approx TD \quad (1)$$

wherein the two matrices T and D have a total of rn+rm entries as compared with the V matrix s nm entries. So long as $$r < nm/(n+m) \quad (2)$$

the total entries of the matrix factors T, D (and therefore the memory requirements) will always be less than the total entries of the index matrix V and the two matrix factors T, D will be a compressed version of the index matrix V. After creation of the matrix factors T, D, the index matrix V may then be deleted and the storage savings realized. In a preferred embodiment, the term matrix T may also be deleted for further storage savings. Note also that, when a new document is added to the database, it is not necessary to generate a new index matrix V—one may simply update the document matrix D.

The greatest storage savings will be realized when r=1, but this will not be practicable when n or m is large. This is because Equation 1 is not an equality, but rather an approximation, which is to say that there is some loss of resolution in the compression. Hence, there must be a tradeoff between the desire to compress the index and the desire to avoid loss of data. Generally speaking, however, r can often be chosen to be about one to about four orders of magnitude smaller than n, preferably about two or three orders of magnitude smaller. Hence, for a database using tens of thousands to millions of words, r values of 100 to 500 will generally suffice. Additional storage savings may be realized by approximating small matrix entries that fall below a predetermined threshold value t with a zero. Typically, one may find that more than 95% of the entries in the document matrix D may safely be set to zero without significant loss of data resolution. These space savings schemes in combination will typically shrink the second index by an order of magnitude.

Methods for effecting the non-negative matrix factorization include those described in D. D. Lee et al., *Learning the*

*Parts of Objects by Non-Negative Matrix Factorization*, Nature, Vol. 401, pp. 788–791, (October 1999), the disclosures of which are incorporated by reference herein in their entirety; or those methods described in D. D. Lee et al., *Algorithms for Non-Negative Matrix Factorization*, Neural Information Processing Systems (2000), the disclosures of which are incorporated by reference herein in their entirety; or any other suitable method. A typical method of carrying out the non-negative matrix factorization is to iteratively execute a set of update rules for T and D that causes the following function to converge to a local maximum:

$$F = \sum_{i=1}^{n}\sum_{j=1}^{m}[V_{ij}\log(TD)_{ij} - (TD)_{ij}] \tag{3}$$

The function of Equation 3 represent the probability of generating the V matrix from the T and D matrices, because the update rules have the effect of adding Poisson noise to the product $(TD)_{ij}$. Equation 3 may also be thought of as a cost function, that increases in value as V approaches TD. The update rules are as follows:

$$T_{ik} \leftarrow T_{ik} \sum_{j} \frac{V_{ij}}{(TD)_{ij}} D_{kj} \tag{4a}$$

$$T_{ik} \leftarrow \frac{T_{ik}}{\sum_{l} T_{lk}} \tag{4b}$$

$$D_{kj} \leftarrow D_{kj} \sum_{i} T_{ik} \frac{V_{ij}}{(TD)_{ij}} \tag{4c}$$

Initial values for the elements of the T and D matrices may be selected by a random number generator, with the constraint that none of the elements be negative. Starting from non-negative initial conditions for T and D, iteration of the update rules of Equations 4 for a non-negative V yields the approximate factorization of Equation 1 by converging to a local maximum of the objective function of Equation 2. The fidelity of the approximation enters the updates through the quotient $V_{ij}/(TD)_{ij}$, which approaches unity with successive iterations. These update rules preserve the non-negativity of T and D and also constrain the columns of T to sum to unity. By constraining the columns of the T matrix to sum to unity, one eliminates the degeneracy associated with the invariance of TD under the transformation $$T \rightarrow T\Lambda \tag{5a}$$

$$D \rightarrow \Lambda^{-1}D \tag{5b}$$

where $\Lambda$ is an r×r diagonal matrix.

Another useful cost function for use with the invention is simply the Euclidean distance between V and TD:

$$\|V - TD\|^2 = \sum_{i=1}^{n}\sum_{j=1}^{m}(V_{ij} - (TD)_{ij})^2 \tag{6}$$

which will vanish as V approaches TD and, therefore, will converge to a minimum upon iteration of the following update rules:

$$D_{kj} \leftarrow D_{kj} \frac{(T^T V)_{kj}}{(T^T TD)_{kj}} \tag{7a}$$

$$T_{ik} \leftarrow T_{ik} \frac{(VD^T)_{ik}}{(TDD^T)_{ik}} \tag{7b}$$

Another useful cost function, similar to Equation 3, is:

$$F = \sum_{i=1}^{n}\sum_{j=1}^{m}\left[V_{ij}\log\frac{V_{ij}}{(TD)_{ij}} - (V_{ij}) + (TD)_{ij}\right] \tag{8}$$

but is unlike Equation 3 in that it vanishes as V approaches TD under the following update rules:

$$D_{kj} \leftarrow D_{kj} \frac{\sum_{i} \frac{T_{ik} V_{ij}}{(TD)_{ij}}}{\sum_{l} T_{lk}} \tag{9a}$$

$$T_{ik} \leftarrow T_{ik} \frac{\sum_{j} \frac{D_{kj} V_{ij}}{(TD)_{ij}}}{\sum_{h} D_{kh}} \tag{9b}$$

Whether the cost function used goes to a maximum or a minimum, the convergence to a limit can be said to be a measure of the distance between V and TD for the purposes of this disclosure, though technically only the cost function of Equation 6 is an actual Euclidean distance. Hence, for convenience, we describe the convergence of the cost function to an upper or lower limit as a minimization of the distance between V and TD. Iteration of the update rules continues until the distance between V and TD is reduce to or beyond a desired value.

From the term and data matrices, T and D, elements of the index matrix V may always be approximately recovered for the purposes of executing a second pass, but a preferred method of executing second pass scoring allows deletion of the term matrix T for further storage savings. In this method, the $\Gamma$ top-scoring documents from the first pass are listed and the information stored. For best performance, the number $\Gamma$ chosen will vary according to the size of the database. As a rule of thumb, $\Gamma$ will be chosen to be from 1 to 20, more preferably from 2 to 5, for every 20,000 to 25,000 or so documents in the database.

In the preferred method of the second pass, the score S for each $j^{th}$ document in the second pass will be a function of it s column entry $D_j$ 200 in the document matrix D and the entries for each $\gamma^{th}$ top scoring document $D_\gamma$:

$$S_j = f(D_j, D_{\gamma=1}, D_{\gamma=2} \ldots D_{t=\Gamma}) \tag{10}$$

There are various ways to compute the value of $S_j$, one of which is cosine-distance based wherein the score of a document is proportional to the summation of cosine distances between $D_j$ and the $\Gamma$ individual vectors $D_\gamma$. As can be seen, the values in the term matrix T are not needed for this method.

It is to be understood that, while the invention has been disclosed with regard to two-pass systems, that this is for illustrative purposes only and the teachings of this invention are applicable to systems of any number of passes, any number of which passes may utilize the non-negative matrix factorization indexing taught herein.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A computer based method of indexing a database of documents, comprising:

providing a vocabulary of n terms;

indexing the database in the form of a non-negative n×m index matrix V, wherein:

m is equal to the number of documents in the database;

n is equal to the number of terms used to represent the database; and the value of each element $v_{ij}$ of index matrix V is a function of the number of occurrences of the $i^{th}$ vocabulary term in the $j^{th}$ document; and factoring out non-negative matrix factors T and D such that V≈TD; wherein T is an n×r term matrix, D is an r×m document matrix, r<nm/(n+m), and r is a rank factorization, and wherein the factorization matrices T and D are a compressed version of the index matrix V.

2. The method of claim 1 further comprising deleting said index matrix V.

3. The method of claim 2 further comprising deleting said term matrix T.

4. The method of claim 1 wherein r is at least one order of magnitude smaller than n.

5. The method of claim 1 wherein r is from two to three orders of magnitude smaller than n.

6. The method of claim 1 wherein entries of said document matrix D falling below a predetermined threshold value t are set to zero.

7. The method of claim 2 wherein r is at least one order of magnitude smaller than n.

8. The method of claim 2 wherein r is from two to three orders of magnitude smaller than n.

9. The method of claim 2 wherein entries of said document matrix D falling below a predetermined threshold value t are set to zero.

10. The method of claim 3 wherein r is at least one order of magnitude smaller than n.

11. The method of claim 3 wherein r is from two to three orders of magnitude smaller than n.

12. The method of claim 3 wherein entries of said document matrix D falling below a predetermined threshold value t are set to zero.

13. A computer based method of indexing a database of documents, comprising:

providing a vocabulary of n terms;

indexing the database in the form of a non-negative n×m index matrix V, wherein:

m is equal to the number of documents in the database;

n is equal to the number of terms used to represent the database; and the value of each element $v_{ij}$ of index matrix V is a function of the number of occurrences of the $i^{th}$ vocabulary term in the $j^{th}$ document;

factoring out non-negative matrix factors T and D such that V≈TD, selecting a cost function and associated update rules from the group:

cost function $$F = \sum_{i=1}^{n}\sum_{j=1}^{m} [V_{ij}\log(TD)_{ij} - (TD)_{ij}]$$

associated with update rules $$T_{ik} \leftarrow T_{ik}\sum_{j}\frac{V_{ij}}{(TD)_{ij}}D_{kj}, \quad T_{ik} \leftarrow \frac{T_{ik}}{\sum_{l}T_{lk}}, \text{ and}$$

$$D_{kj} \leftarrow D_{kj}\sum_{i}T_{ij}\frac{V_{ij}}{(TD)_{ij}},$$

cost function $$F = \sum_{i=1}^{n}\sum_{j=1}^{m}\left[V_{ij}\log\frac{V_{ij}}{(TD)_{ij}} - (V_{ij}) + (TD)_{ij}\right]$$

associated with update rules $$D_{kj} \leftarrow D_{kj}\frac{\sum_{i}\frac{T_{ik}V_{ij}}{(TD)_{ij}}}{\sum_{l}T_{lk}} \text{ and}$$

$$T_{ik} \leftarrow T_{ik}\frac{\sum_{j}\frac{D_{kj}V_{ij}}{(TD)_{ij}}}{\sum_{h}D_{kh}},$$

and cost function $$\|V - TD\|^2 = \sum_{i=1}^{n}\sum_{j=1}^{m}(V_{ij} - (TD)_{ij})^2$$

associated with update rules $$D_{kj} \leftarrow D_{kj}\frac{(T^T V)_{kj}}{(T^T TD)_{kj}} \text{ and } T_{ik} \leftarrow T_{ik}\frac{(VD^T)_{ik}}{(TDD^T)_{ik}},$$

and wherein T is an n×r term matrix, D is an r×m document matrix, r<nm/(n+m), and r is a rank factorization; and iteratively calculating said update rules so as to converge said cost function toward a limit until the distance between V and TD is reduced to or beyond a desired value.

14. A program storage device readable by machine, tangibly embodying a program of instructions executable by the machine to perform method steps for indexing a database of documents, said method steps comprising:

providing a vocabulary of n terms;

indexing the database in the form of a non-negative n×m index matrix V, wherein:

m is equal to the number of documents in the database;

n is equal to the number of terms used to represent the database; and the value of each element $v_{ij}$ of index matrix V is a function of the number of occurrences of the $i^{th}$ vocabulary term in the $j^{th}$ document; and factoring out non-negative matrix factors T and D such that V≈TD, wherein T is an n×r term matrix, D is an r×m document matrix, r<nm/(n+m), and r is a rank factorization.

15. A computer based method of information retrieval, comprising:

providing a query comprising a plurality of search terms;

providing a vocabulary of n terms;

performing a first pass retrieval through a first database representation and scoring m retrieved documents according to relevance to said query;

executing a second pass retrieval through a second database representation and scoring documents retrieved from said first pass retrieval so as to generate a final relevancy score for each document; and wherein said second database representation comprises an r×m document matrix D, such that $$V \approx TD$$

wherein T is an n×r term matrix, and r is a rank factorization;

V is a non-negative n×m index matrix, wherein each of its m columns represents an $j^{th}$ document having n entries containing the value of a function of the number of occurrences of a $i^{th}$ term of said vocabulary appearing in said $j^{th}$ document; and wherein T and D are non-negative matrix factors of V and r<nm/(n+m); and wherein each of the m columns of said document matrix D corresponds to said $j^{th}$ document.

16. The method of claim 15 wherein said final relevancy score for any $j^{th}$ document is a function of said $j^{th}$ document s corresponding entry in said document matrix D and the corresponding entries in said document matrix D of the Γ top-scoring documents from said first pass retrieval.

17. The method of claim 16 wherein said relevancy score function for said $j^{th}$ document is proportional to a sum of cosine distances between said $j^{th}$ document s corresponding entry in said document matrix D and each of said corresponding entries in said document matrix D of the Γ top-scoring documents from said first pass retrieval.

18. The method of claim 15 wherein r is at least one order of magnitude smaller than n.

19. The method of claim 15 wherein r is from two to three orders of magnitude smaller than n.

20. The method of claim 15 wherein entries of said document matrix D falling below a predetermined threshold value t are set to zero.

21. A program storage device readable by machine, tangibly embodying a program of instructions executable by the machine to perform method steps for information retrieval, said method steps comprising:

providing a query comprising a plurality of search terms;

providing a vocabulary of n terms;

performing a first pass retrieval through a first database representation and scoring m retrieved documents according to relevance to said query;

executing a second pass retrieval through a second database representation and scoring documents retrieved from said first pass retrieval so as to generate a final relevancy score for each document; and wherein said second database representation comprises an r×m document matrix D, such that $$V \approx TD$$

wherein T is an n×r term matrix; and r is a rank factorization;

V is a non-negative n×m index matrix, wherein each of its m columns represents an $j^{th}$ document having n entries containing the value of a function of the number of occurrences of a $i^{th}$ term of said vocabulary appearing in said $j^{th}$ document; and wherein T and D are non-negative matrix factors of V and r<nm/(n+m); and wherein each of the m columns of said document matrix D corresponds to said $j^{th}$ document.

* * * * *